Sept. 13, 1966  ÅKE MALMGREN  3,272,363
TRANSPORTATION VEHICLE

Filed Oct. 29, 1963  2 Sheets-Sheet 1

INVENTOR.
Åke Malmgren
BY Sommers & Young
Attorneys

United States Patent Office 3,272,363
Patented Sept. 13, 1966

3,272,363
TRANSPORTATION VEHICLE
Åke Malmgren, Tvargatan 5, Kiruna, Sweden
Filed Oct. 29, 1963, Ser. No. 319,870
1 Claim. (Cl. 214—505)

The present invention relates to a transportation vehicle, and more particularly to a vehicle for the transportation of loading machines and other heavy objects in tunnels of mines and similar narrow passages.

The vehicle according to the invention is of the type, comprising the combination of a power vehicle having preferably a single pair of wheels and a trailer pivotally coupled to the power vehicle by a link connection controllable for steering purpose from the driver's seat on the power vehicle.

An essential feature of said combination is that the frame of the trailer is provided with a bottom mounted to swing on a transversal shaft, said bottom having rearwardly extending arms adapted in the rearwardly tipped position of the bottom to form a ramp along which the loading machine or other object to be transported may be brought onto the trailer.

Another feature is that the frame of the trailer is U-shaped with its open end facing rearwardly and supporting bearings for the wheel axles and the pivotal shaft of the swingable bottom at the free ends of the side portions of the frame.

Still further features will be evident from the following description with reference to the drawings and more precisely defined in the annexed claim.

Figure 1:
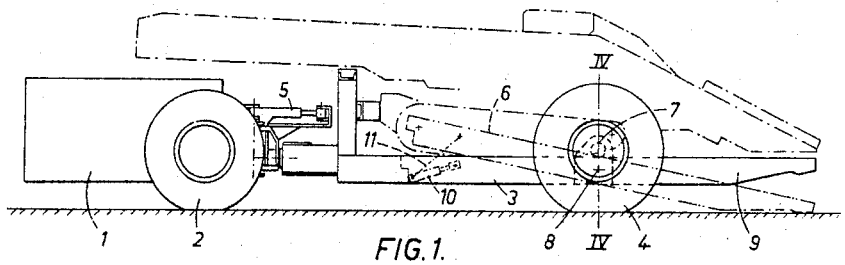
Figure 2:
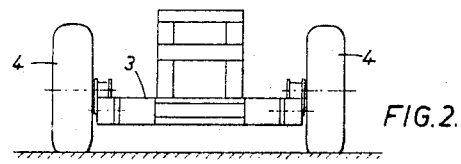
Figure 3:
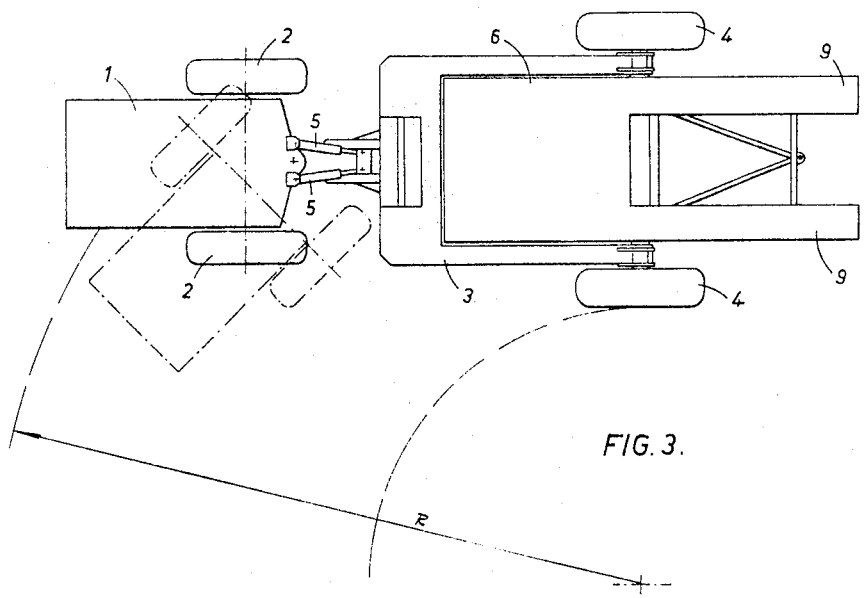
Figure 4:
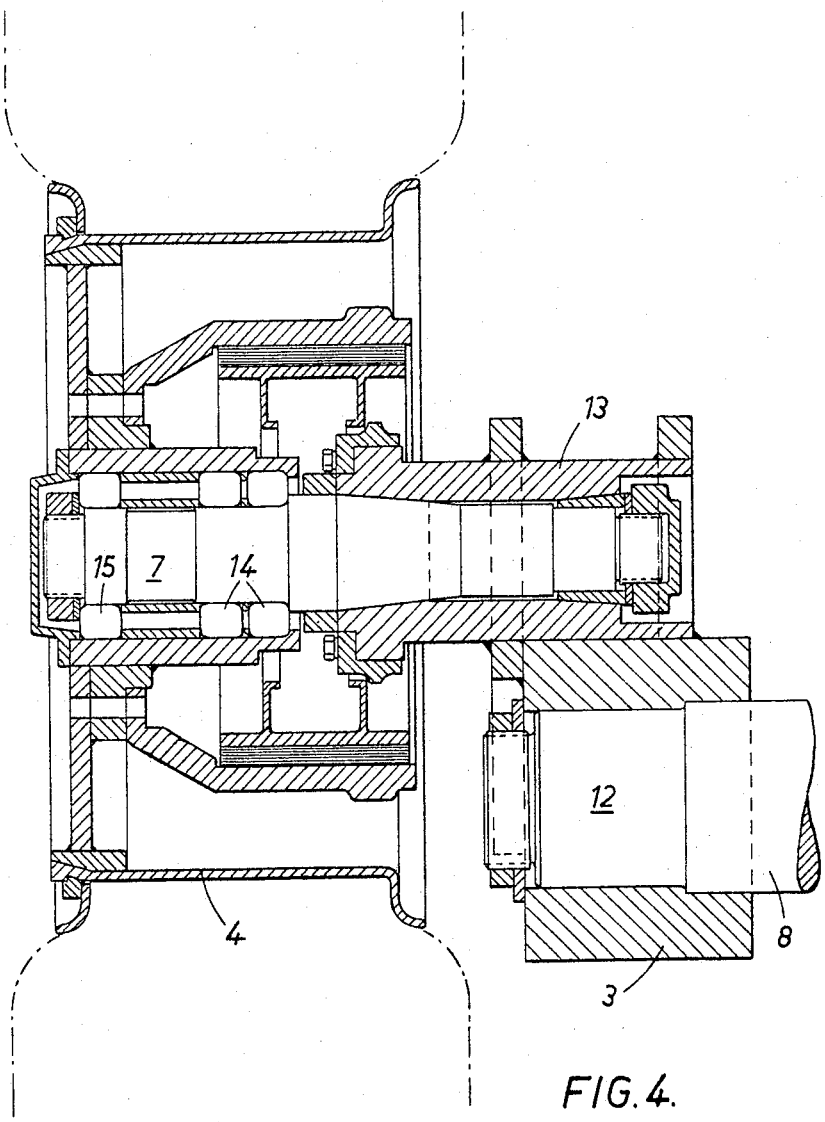

In the drawings, FIG. 1 is a side elevation of a vehicle exemplifying the invention. FIG. 2 is an end view of said vehicle looking from the rear end thereof. FIG. 3 is a top plan view of the vehicle, and FIG. 4 is a cross section on a larger scale along line IV—IV of FIG. 1 of the bearing means for one wheel axle and one end of the pivotal shaft of the swingable bottom.

The combined vehicle shown by way of example comprises a power vehicle 1 having a pair of wheels 2 and a trailer including a frame 3 and a pair of wheels 4. The power vehicle may, for instance, be of the structure described in the U.S. Patent No. 3,063,511. The frame 3 of the trailer is coupled to the frame of the power vehicle by means of a pivotal connection allowing the fore end of the trailer frame 3 to be carried by the wheels 2 of the power vehicle and further allowing the power vehicle and the trailer to swing with relation to each other about a vertical axis for steering purposes. Said swinging motion is effected and controlled by means of a link connection including hydraulic or analogous steering cylinders 5 which may be controlled by the driver on the power vehicle.

The trailer frame 3 is U-shaped viewed in plan, as shown in FIG. 3, the wheels 4 being positioned at the rear end of the frame. The frame 3 surrounds by its fore end portion and by its side portions a bottom 6, which is swingably mounted on a transversal shaft which in the example shown is located below the axles of the vehicle wheels 4. In FIG. 1 a wheel axle is indicated at 7 and the position of the pivotal shaft of the bottom 6 is indicated by a cross at 8.

The bottom 6 is formed with two rearwardly extending arms 9 representing extensions of the longitudinal side portions of the bottom. Said arms are of a length as reckoned from the rear ends of the frame 3 which is substantially as long as the bottom proper. Said arms are adapted to bear against the ground by their free ends in the downwardly swung position of the bottom, so as to act as ramps along which a loading machine or another object to be transported by the trailer may be brought onto the trailer and discharged therefrom after the trailer has reached the respective unloading point.

In FIG. 1 said downwardly swung position of the bottom 6 is indicated by dotted lines. Also indicated by dotted lines in FIG. 1 is the outline of a loading machine resting on the trailer with the bottom of the trailer in its normal position.

The swinging motion of the bottom 6 is effected and controlled by means of one or more hydraulic cylinders provided between the frame 3 and the bottom 6, as indicated at 10 in FIG. 1, where the uppermost position of the cylinders is marked by the dotted line 11.

In FIG. 3 the turning radius of the combined vehicle is indicated at R and may in relation to the length of the combined vehicle be considered as a minimum. The use of a small turning radius is possible, in part, due to the small length of the power vehicle when constructed as set forth in the U.S. Patent No. 3,063,511, and in part, due to the great lateral swinging movement the power vehicle may perform with relation to the trailer due to the link connection between the power vehicle and the trailer, as will appear from FIG. 3.

FIG. 4 shows an embodiment of the bearing mechanism provided for the one wheel axle and one end of the pivotal shaft of the swingable bottom.

With reference to FIG. 4 the numeral 7 designates the wheel axle and the numeral 8 designates the pivotal shaft of the bottom. Shaft 8 which extends between the two side elements of the U-shaped frame 3 is formed at each end as a pin 12 which is clamped into the respective side portion of frame 3. In this case the bottom is assumed to be pivotally mounted on shaft 8 by means of well known, easily moved bearing elements, not shown in the drawing. It is to be noted that, of course, the shaft may be pivotally mounted in the lateral portions of the frame 3 and rigidly connected to the bottom without in any way departing from the principle or scope of the invention.

Welded to the respective side portion of frame 3 at a point right above the pin 12 is a sleeve 13 in which an extension of shaft 7 which is conically shaped along a portion of its length is clamped against axial displacement. Pivotally mounted, as by means of roller bearings 14 and 15, on the portion of the axle 7 projecting beyond the sleeve 13 is the wheel 4.

As will appear from FIG. 1 the load, as for instance, a loading machine, is resting on the bottom 6 proper, after moved up along the arms 9 and swinging up of the bottom with the arms into horizontal position. In this position the load is supported by the wheels 2 and 4 in common, while the arms 9 are completely unloaded.

By means of the combined vehicle hereinbefore described it will be possible to transport loading machines or other self-propelling implement in tunnels of mines or other narrow passages at a speed considerably higher than that the machine or implement may produce by itself.

I claim:

In a vehicle especially for the transportation of wheeled loads in narrow passages comprising in combination, a power vehicle having a single pair of wheels, a trailer having likewise a single pair of wheels, and a controllable link connection for steerably coupling the trailer to the power vehicle, said trailer being provided with a U-shaped rigid frame member having its open end facing rearwardly and a movable frame member swingable about a transverse axis between a normal position on a level with the rigid frame member in which position it is surrounded on three of its sides by said rigid frame member so as to form a bottom therein and a rearwardly inclined position, said bottom member having a pair of rearwardly extending arms to act as a ramp for the wheeled load in the rearwardly swung position of the bottom member.

bearings for the transverse shaft of the movable frame member as well as bearings for the wheel axles of the rigid frame member being provided at the free ends of the side portions of the rigid frame member, said transverse shaft of the movable frame member being positioned on a lower level than the axles of the wheels of the rigid frame member, said axles of the wheels of the rigid frame member being clamped in sleeves rigidly connected to the rigid frame member and carrying ball bearings for the wheels, and the shaft of the movable frame member being clamped by its ends into borings in the side portions of the rigid frame member, the movable frame member being pivotally mounted on said shaft

References Cited by the Examiner

UNITED STATES PATENTS

| | | | |
|---|---|---|---|
| 2,818,187 | 12/1957 | Cooley | 214—505 |
| 3,066,816 | 12/1962 | Schwartz | 214—505 |

GERALD M. FORLENZA, *Primary Examiner.*

A. J. MAKAY, *Assistant Examiner.*